United States Patent
Seo et al.

(10) Patent No.: US 12,313,748 B2
(45) Date of Patent: May 27, 2025

(54) METHOD FOR GLOBAL NAVIGATION SATELLITE SYSTEM (GNSS) POSITIONING AND ELECTRONIC DEVICE PERFORMING THE SAME

(71) Applicant: SAMSUNG ELECTRONICS CO., LTD., Suwon-si (KR)

(72) Inventors: Donghwan Seo, Suwon-si (KR); Hyungpil Kum, Suwon-si (KR); Hyeonchang Son, Suwon-si (KR); Jinbae Lee, Suwon-si (KR); Kyeongmun Jo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 340 days.

(21) Appl. No.: 17/856,343

(22) Filed: Jul. 1, 2022

(65) Prior Publication Data
US 2023/0016261 A1    Jan. 19, 2023

Related U.S. Application Data

(63) Continuation of application No. PCT/KR2022/007021, filed on May 17, 2022.

(30) Foreign Application Priority Data

Jul. 14, 2021 (KR) .......................... 10-2021-0092321

(51) Int. Cl.
*G01S 19/21* (2010.01)
*G01S 19/40* (2010.01)
(Continued)

(52) U.S. Cl.
CPC .............. *G01S 19/21* (2013.01); *G01S 19/40* (2013.01); *G01S 19/23* (2013.01); *G01S 19/29* (2013.01);
(Continued)

(58) Field of Classification Search
CPC .......... G01S 19/21; G01S 19/14; G01S 19/23; G01S 19/29; G01S 19/40; H04B 1/7073; H04B 1/7113; H04B 2201/70728
(Continued)

(56) References Cited

U.S. PATENT DOCUMENTS

| | | | |
|---|---|---|---|
| 6,867,734 B2 | 3/2005 | Voor et al. | |
| 7,924,104 B2 * | 4/2011 | Huang ................... | G04R 40/06 331/65 |

(Continued)

FOREIGN PATENT DOCUMENTS

| | | |
|---|---|---|
| JP | 2011216972 A | 10/2011 |
| JP | 2018036274 A | 3/2018 |

(Continued)

*Primary Examiner* — Chuong P Nguyen
(74) *Attorney, Agent, or Firm* — CANTOR COLBURN LLP

(57) ABSTRACT

Disclosed is a method for global navigation satellite system (GNSS) positioning and an electronic device performing the method. According to an example embodiment, the method includes monitoring whether an error of the GNSS positioning occurs, determining, when the error of the GNSS positioning is detected, whether a first output frequency of a first phase locked loop (PLL) used for demodulating a GNSS signal received from a satellite for the GNSS positioning is stable, and changing, when the first output frequency of the first PLL is unstable, a frequency used for demodulating the GNSS signal to a second output frequency of a second PLL or a basic frequency input to the first PLL and the second PLL.

20 Claims, 7 Drawing Sheets

(51) Int. Cl.
   *G01S 19/23* (2010.01)
   *G01S 19/29* (2010.01)
   *H04B 1/7073* (2011.01)
   *H04B 1/7113* (2011.01)
(52) U.S. Cl.
   CPC .......... *H04B 1/7073* (2013.01); *H04B 1/7113* (2013.01); *H04B 2201/70728* (2013.01)
(58) Field of Classification Search
   USPC ............ 342/357.59, 357.62, 357.52, 357.68, 342/357.23
   See application file for complete search history.

(56) References Cited

U.S. PATENT DOCUMENTS

| | | | |
|---|---|---|---|
| 8,451,169 B2 * | 5/2013 | Yang | G01S 19/235 342/357.62 |
| 8,847,819 B2 | 9/2014 | Ramasubramanian et al. | |
| 10,666,274 B2 | 5/2020 | Jung et al. | |
| 11,088,695 B2 * | 8/2021 | Bae | H03L 7/089 |
| 12,092,746 B2 * | 9/2024 | Kowada | G01S 19/07 |
| 2016/0373121 A1 * | 12/2016 | Lee | H03L 7/085 |
| 2023/0288572 A1 * | 9/2023 | Doshi | G01S 5/01 |
| 2024/0069213 A1 * | 2/2024 | Caparra | G01S 19/22 |

FOREIGN PATENT DOCUMENTS

| | | | |
|---|---|---|---|
| KR | 20050005485 A | 1/2005 | |
| KR | 20130049718 A | 5/2013 | |
| KR | 20140125206 A | 10/2014 | |
| KR | 20140138035 A | 12/2014 | |
| KR | 20200036735 A | 4/2020 | |
| KR | 20210013720 A | 2/2021 | |
| KR | 20210034991 A | 3/2021 | |
| KR | 102609093 B1 * | 12/2023 | ............. G01S 19/24 |

* cited by examiner

METHOD FOR GLOBAL NAVIGATION SATELLITE SYSTEM (GNSS) POSITIONING AND ELECTRONIC DEVICE PERFORMING THE SAME

CROSS-REFERENCE TO RELATED APPLICATIONS

This application is a continuation application, claiming priority under § 365(c), of International Application No. PCT/KR2022/007021 designating the United States, filed on May 17, 2022, in the Korean Intellectual Property Receiving Office and claiming priority to Korean Patent Application No. 10-2021-0092321, filed on Jul. 14, 2021, in the Korean Intellectual Property Office, the disclosures of which are incorporated by reference herein in their entireties.

BACKGROUND

1. Field

The disclosure relates to a global navigation satellite system (GNSS) positioning technology of an electronic device.

2. Description of Related Art

A configuration for global navigation satellite system (GNSS) positioning includes a GNSS satellite group for transmitting a signal, a receiving antenna for receiving a signal in from a smart device, and a processor for processing the received signal.

A GNSS signal may transmitted and received using an L band, which is a communication band between 1 gigahertz (GHz) and 2 GHz. For example, in an L1 band, a global positioning system (GPS) may use 1575.42 megahertz (MHz), GLONASS may use 1602 MHz, Beidou may use 1561.098 MHz, and Galileo may use 1575.42 MHz. In an L2 band, GPS may use 1227.60 MHz. In an L5 band, GPS and Galileo may use 1176.45 MHz, and GLONASS and Beidou may use 1207.14 MHz.

A crystal oscillator component such as an XO or TCXO is used to demodulate a GNSS satellite signal. A radio frequency (RF) system including a GNSS includes a phase locked loop (PLL) in order to use a frequency stably.

SUMMARY

As a configuration for fifth-generation (5G) communication is added to an electronic device for performing global navigation satellite system (GNSS) positioning such as a smartphone or a navigation device, components for GNSS positioning and components for the 5G communication may be placed adjacently. When the GNSS-related components and the components for the 5G communication are placed adjacently, during the 5G communication, a clock drift in which a frequency is shifted may occur at an output frequency of a phase locked loop (PLL) due to coupling noise generated between a 5G antenna and the GNSS-related components.

Example embodiments of the disclosure may provide a method for GNSS positioning and an electronic device performing the method to solve issues in GNSS positioning due to the clock drift.

According to various example embodiments, a method for GNSS positioning includes monitoring whether an error of the GNSS positioning occurs, determining, when the error of the GNSS positioning is detected, whether a first output frequency of a first PLL used for demodulating a GNSS signal received from a satellite for the GNSS positioning is stable, and changing, when the first output frequency of the first PLL is unstable, a frequency used for demodulating the GNSS signal to a second output frequency of a second PLL, or a basic frequency input to the first PLL and the second PLL.

According to various example embodiments, an electronic device includes a processor, a GNSS antenna configured to receive a GNSS signal from a satellite to perform GNSS positioning, a transceiver including a GNSS receiver that demodulates the GNSS signal, a radio frequency (RF) transceiver, a first PLL that provides a first output frequency for operating the GNSS receiver, and a second PLL that provides a second output frequency for operating the RF transceiver, and configured to communicate with the processor, and a 5G module including an antenna for 5G communication and configured to communicate with the RF transceiver. The processor is configured to monitor whether an error of the GNSS positioning occurs during the 5G communication, determine whether the first output frequency of the first PLL used for demodulating the GNSS signal is stable, and change, when the first output frequency of the first PLL is unstable, a frequency used for demodulating the GNSS signal to the second output frequency of the second PLL or a basic frequency input to the first PLL and the second PLL.

According to various example embodiments, a method for GNSS positioning in an electronic device having 5G communication capability includes determining a current movement path of the electronic device and predicting an entry into an area in which the 5G communication is available based on the current movement path and 5G network coverage map data including information on the area in which the 5G communication is available. When a record that a frequency used for demodulating a GNSS signal is changed is present, the frequency used for demodulating the GNSS signal is changed from a first output frequency of a first PLL of the electronic device to a second output frequency of a second PLL of the electronic device before entering the area in which the 5G communication is available.

According to example embodiments, it is possible to provide a method for GNSS positioning and the electronic device performing the method to quickly solve GNSS positioning issues using a frequency of a stable PLL or a frequency before an input of a PLL instead of using a frequency affected by a component or a 5G antenna when 5G communication and GNSS are used simultaneously.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
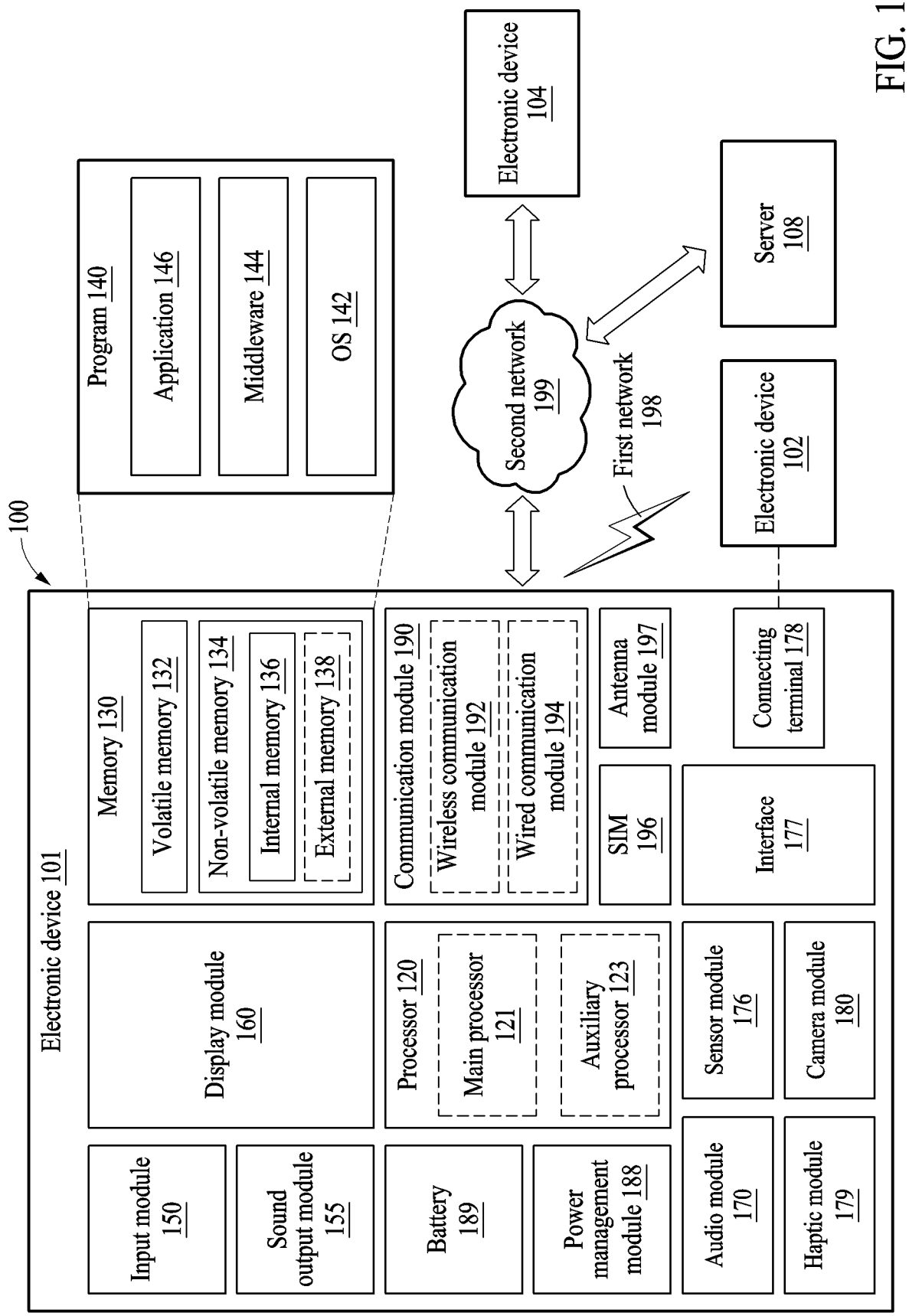
FIG. 1 is a block diagram illustrating an example electronic device in a network environment according to various example embodiments.

One or more embodiments of the invention now will be described more fully hereinafter with reference to the accompanying drawings, in which various embodiments are shown. One or more embodiments may, however, be embodied in many different forms, and should not be construed as limited to the embodiments set forth herein. Rather, these embodiments are provided so that this disclosure will be thorough and complete, and will fully convey the scope of embodiments of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), and/or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and/or an antenna module 197. In some example embodiments, at least one (e.g., the connecting terminal 178) of the above components may be omitted from the electronic device 101, and/or one or more other components may be added in the electronic device 101. In some example embodiments, some (e.g., the sensor module 176, the camera module 180, and/or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly (e.g., wired) or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit to (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., substantially 20 Gbps or more) for implementing eMBB, loss coverage (e.g., substantially 164 dB or less) for implementing mMTC, or U-plane latency (e.g., substantially 0.5 ms or less for each of downlink (DL) and uplink (UL), or a round trip of substantially 1 ms or less) for implementing URLLC.

The antenna module 197 may transmit or receive a signal or power to or from the outside (e.g., the external electronic device) of the electronic device 101. According to an example embodiment, the antenna module 197 may include a slit antenna, and/or an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the electronic device 104 via the server 108 coupled with the second network 199. Each of the electronic devices 102 and 104 may be a device of the same type as or a different type from the electronic device 101. According to an example embodiment, all or some of operations to be executed by the electronic device 101 may be executed at one or more of the electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the electronic device 104 may include an Internet-of-things (IoT) device. The server 108 may be an intelligent server using machine learning and/or a neural network. According to an example embodiment, the electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
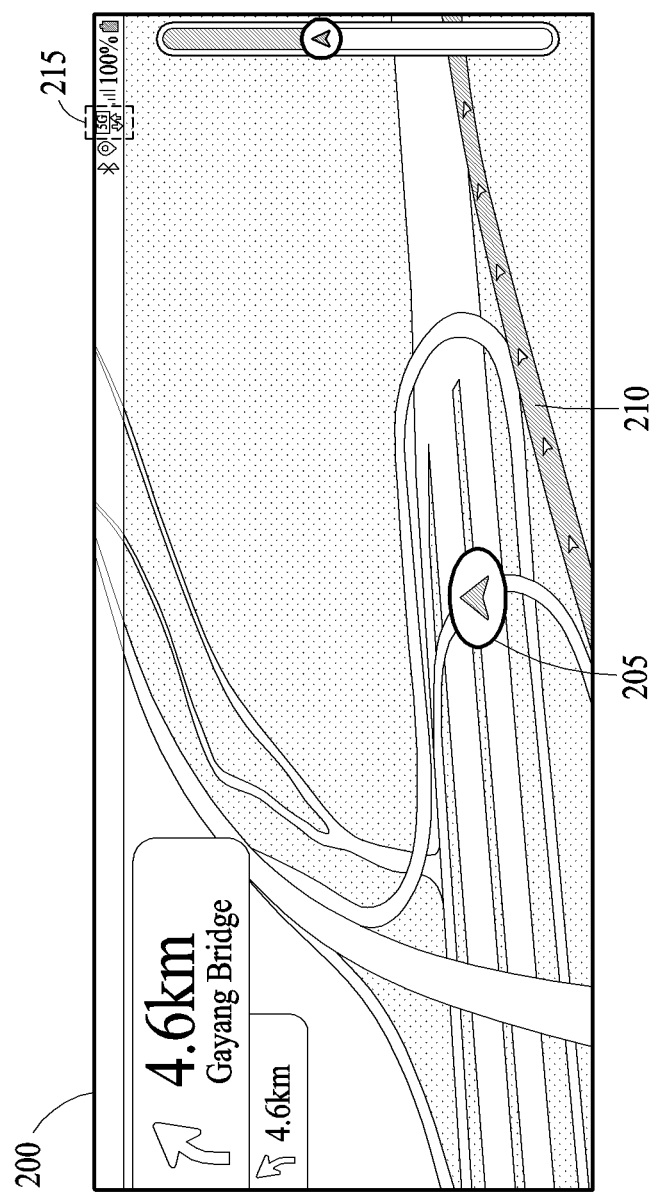
FIG. 2 is a diagram illustrating a method for global navigation satellite system (GNSS) and an electronic device performing the method according to an example embodiment.

FIG. 2 is a diagram illustrating a method for global navigation satellite system (GNSS) and an electronic device performing the method according to an example embodiment.

FIG. 2 illustrates a navigation screen 200 displayed on a display (e.g., the display module 160) of an electronic device (e.g., the electronic device 101 of FIG. 1). In an example embodiment, the electronic device may include a GNSS positioning device (e.g., a GNSS positioning device 300 of FIG. 3) for GNSS positioning.

A GNSS is a global positioning information service system. The GNSS positioning device may perform GNSS positioning to determine a three-dimensional position of the GNSS positioning device in real time by using the GNSS. The GNSS positioning device on the ground may receive GNSS signals, which are radio waves sent from multiple satellites for GNSS positioning. The GNSS signal may include navigation information of the satellite, for example, orbit information (ephemeris and almanac) indicating an orbit of the satellite. The GNSS positioning device may determine the three-dimensional position of the GNSS positioning device in real time based on a trilateration method by measuring the orbit information of the satellite and an arrival time of the received GNSS signal.

The navigation screen 200 of FIG. 2 may include a movement path of the GNSS positioning device, a current position 205 of the GNSS positioning device measured through GNSS positioning of the GNSS positioning device, and information 215 on a radio frequency (RF) communication scheme, for example, third-generation (3G), fourth-generation (4G), and/or fifth-generation (5G) communication).

For positioning, the GNSS positioning device may include a GNSS antenna that receives a GNSS signal, a GNSS front-end module that delivers the GNSS signal to a GNSS receiver, and the GNSS receiver. In addition, for 5G communication, the GNSS positioning device may include a 5G communication module and an RF transceiver. The GNSS positioning device may include phase locked loops (PLLs) that provide frequencies for operations of the GNSS receiver and the RF transceiver. A configuration of the GNSS positioning device will be described in detail with reference to FIG. 3.

For GNSS positioning, the GNSS signal received from the satellite through the GNSS antenna may be demodulated in the GNSS receiver. The GNSS receiver may receive a stable frequency from the PLL and demodulate the GNSS signal using the frequency provided from the PLL.

The millimeter wave (mmWave) used for the 5G communication has a frequency band of 30 to 300 gigahertz (GHz) with a wavelength in units of millimeters, and has a directional characteristic. Due to the directivity characteristic, beamforming may be performed through an array antenna during the 5G communication. The GNSS positioning device may include two or more 5G communication modules to secure omnidirectional radiation characteristics. As 5G modules are added to the GNSS positioning device, GNSS-related components (e.g., the GNSS antenna, the GNSS front-end module, the GNSS receiver, and the PLL) and 5G modules may be placed adjacently. When GNSS-related components and 5G modules are placed adjacent to each other, during the 5G communication, a clock drift in which a frequency is shifted may occur at an output frequency of the PLL due to coupling noise generated between a 5G antenna and the GNSS-related components.

If a clock drift occurs in the output frequency of the PLL, which is a frequency used for demodulation of the GNSS signal, demodulation of the GNSS signal may not be performed smoothly in the GNSS receiver. If a problem occurs in demodulation of the GNSS signal, the current position of the GNSS positioning device as a result of the GNSS positioning may not be correctly acquired, so positional deviation may occur or position acquisition may fail.

As illustrated in FIG. 2, the 5G communication of the GNSS positioning device may be initiated and a clock drift may occur in the output frequency of the PLL, which is a frequency for demodulating the GNSS signal, due to coupling noise between the 5G antenna and GNSS-related components. Due to the clock drift, the GNSS positioning device may not correctly acquire the current position 205 of the electronic device moving on the movement path 210, and may be displayed as deviating from the movement path 210.

According to an example embodiment, when the GNSS positioning device fails to acquire the correct position of the electronic device, the GNSS positioning device may determine whether the output frequency of the PLLs is stable and change the frequency used for demodulation of the GNSS signal to an output frequency of the PLL, which is less affected by the 5G communication module, or a basic frequency input to the PLL. Through this, the GNSS positioning device may minimize an occurrence of an GNSS positioning error when the 5G communication is initiated and GNSS performance is degraded. A configuration of the GNSS positioning device will be described below with reference to FIG. 3.

Figure 3:
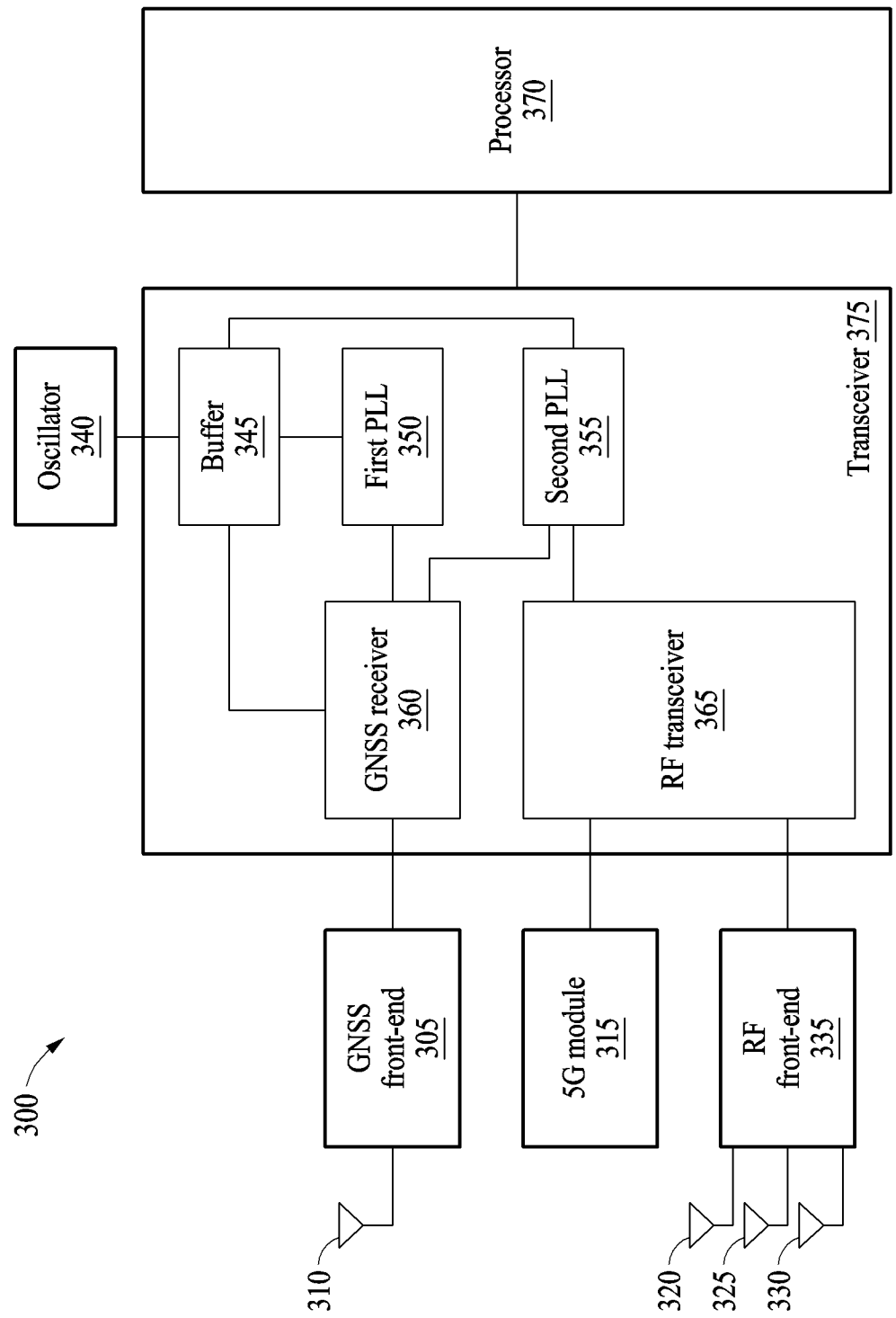
FIG. 3 is a block diagram illustrating a device performing a method for GNSS positioning according to an example embodiment.

FIG. 3 is a block diagram illustrating a device performing a method for GNSS positioning according to an example embodiment.

According to an example embodiment, a GNSS positioning device 300 may include an oscillator 340 that provides a frequency for operating transceiver 375, the transceiver 375, a processor 370 (e.g., the processor 120) that generates data for communication, communicates with the transceiver 375, and controls the transceiver 375, a GNSS antenna 310 that receives a GNSS signal for GNSS positioning from a satellite, a GNSS front-end 305, a 5G module 315, a 4G antenna 320, a 3G antenna 325, the 5G sub-6 antenna 330, and an RF front-end 335.

The transceiver 375 may include a buffer 345 that receives a frequency generated from the oscillator 340 and transmits a basic frequency to each PLL, at least one PLL (e.g., a first PLL 350 and a second PLL 355) that provides a frequency for operating a GNSS receiver 360 and an RF transceiver 365, the GNSS receiver 360 that demodulates the GNSS signal, and the RF transceiver 365.

The oscillator 340, the transceiver 375, the GNSS front-end 305, the 5G module 315, and the RF front-end 335 may be included in the wireless communication module 192 of the electronic device 101 of FIG. 1. The GNSS antenna 310 and RF antennas (e.g., the 4G antenna 320, the 3G antenna 325, and the 5G sub-6 antenna 330) may be included in the antenna module 197 of the electronic device 101 of FIG. 1.

The GNSS positioning device 300 may receive a GNSS signal from a satellite through the GNSS antenna 310 to acquire data for GNSS positioning. The GNSS antenna 310 may have a communication band of about 1.1 to 1.6 GHz, and may receive signals L1, L2, and L5 for each satellite group (e.g., GPS, GLONASS, BEIDOU, and GALILEO).

The GNSS signal may include navigation information of the satellite, for example, orbit information (ephemeris and almanac) indicating an orbit of the satellite. The GNSS signal may be transmitted from the GNSS antenna 310 to the GNSS receiver 360 through the GNSS front-end 305. The GNSS front-end 305 may include an impedance matching circuit, an amplifier that amplifies a received signal, and a filter that removes unnecessary frequency components. The GNSS front-end 305 may receive an enable signal from the GNSS receiver 360 for operating the amplifier.

The GNSS receiver 360 may demodulate the GNSS signal for GNSS positioning. The GNSS receiver 360 may obtain a pseudo range between the satellite and the GNSS positioning device 300 through satellite acquisition, and may transmit navigation information to the processor 370.

The GNSS positioning device 300 may include at least one 5G module 315 for the 5G communication using a millimeter wave. The 5G module 315 may transmit and receive 5G new radio (NR) millimeter wave signals. The 5G module 315 may include a front-end that includes an amplifier and a filter and performs impedance matching, an array antenna for 5G signal transmission and reception, a phase shifter for beamforming, and an up/down converter used to increase or decrease a RF frequency. Due to high frequency characteristics of the millimeter wave, if a transmission line is made long on a printed circuit board (PCB), the transmission loss may be large and impedance matching may be difficult. Thus, the 5G module 315 may be integrated and modularized.

FIG. 3 illustrates that the GNSS positioning device 300 includes one 5G module 315. However, since the millimeter wave has directional characteristics, the GNSS positioning device 300 may include two or more 5G modules 315 to obtain omnidirectional characteristics.

The GNSS positioning device 300 may further include the RF front-end 335 including a 4G front-end for 4G communication, a 3G front-end for 3G communication, and a 5G sub-6 front-end for 5G sub-6 communication. The GNSS positioning device 300 may include the 4G antenna 320 that receives a 4G RF signal, the 3G antenna 325 that receives a 3G RF signal, and the 5G sub-6 antenna 330 that receives a 5G sub-6 signal. A frequency of 5G sub-6 communication is 6 GHz or less, and a circuit for the 5G sub-6 communication may be configured to include the 5G sub-6 antenna 330 and the RF front-end 335 differently from the millimeter wave. The RF front-end 335 may include a noise filter, an amplifier, a switching circuit for frequency change, and a circuit for impedance matching. The RF front-end 335 may transmit an RF signal received through the 4G antenna 320, the 3G antenna 325, and the 5G sub-6 antenna 330 to the RF transceiver 365 or receive an RF signal from the RF transceiver 365 for RF signal transmission through the 4G antenna 320, the 3G antenna 325, and the 5G sub-6 antenna 330. The RF front-end 335 may be controlled by the RF transceiver 365.

The RF transceiver 365 may include a digital-to-analog converter (DAC) that modulates digital data generated by the processor 370 into an analog signal for transmission according to 5G, 4G, and 3G communication standards, and an analog-to-digital converter (ADC) that demodulates an analog signal received through the antennas 320, 325, and 330 or the array antenna of the 5G module 315 into a digital signal. The RF transceiver 365 may transmit data included in the demodulated digital signal to the processor 370.

The GNSS positioning device 300 may include the transceiver 375 including the GNSS receiver 360 and the RF transceiver 365. The GNSS positioning device 300 may include the oscillator 340 to provide a frequency for the operation of the transceiver 375. The oscillator 340 may supply a frequency for generating a frequency band required to demodulate or modulate a signal. The oscillator 340 may be, for example, a crystal oscillator (XO) or a temperature-controlled crystal oscillator (TCXO). However, it is merely an example, and various types of the oscillator 340 may be included.

The transceiver 375 may include at least one PLL to provide a stable frequency to the GNSS receiver 360 and the RF transceiver 365 based on the frequency provided from the oscillator 340. The PLL may control an output signal by comparing phases of the input signal and the output signal. The PLL may adjust the frequency of the output signal based on the input signal. In a high-frequency system, even small influences may cause frequency changes. For this reason, the PLL may include a voltage controller oscillator (VCO) and a phase frequency detector for stable frequency supply. The PLL may include an input buffer and an output buffer and monitor a frequency through the input buffer and the output buffer. If the PLL is affected by external noise or jamming signals, it may be difficult to supply a stable frequency, which may cause a problem in demodulating the GNSS signal in the GNSS receiver 360.

In FIG. 3, the transceiver 375 includes the first PLL 350 that provides the frequency to the GNSS receiver 360 and the second PLL 355 that provides the frequency to the RF transceiver 365. However, it is merely an example, and the transceiver 375 may include three PLLs or more.

The transceiver 375 may include the buffer 345 that receives the frequency generated in the oscillator 340 and transmits a basic frequency to each PLL.

The GNSS positioning device 300 may further include a power supply (not shown). The power supply may supply power to the GNSS front-end 305, the 5G module 315, and the RF front-end 335. The power supply may be controlled by the processor 370. Also, the power supply may power on or off the GNSS front-end 305, the 5G module 315, and the RF front-end 335, individually.

In the example embodiment of FIG. 3, the output frequency (also referred to as a first output frequency) of the first PLL 350 may be provided to the GNSS receiver 360 and used for demodulation of the GNSS signal. The output frequency (also referred to as a second output frequency) of the second PLL 355 may be transferred to the RF transceiver 365 and used for modulation and demodulation of the RF signal.

The processor 370 may generate data for communication, communicate with the transceiver 375, and control the transceiver 375. The processor 370 may monitor a GNSS positioning error that occurs after the 5G communication starts, and detect an occurrence of a GNSS positioning error. In an example embodiment, if a current position of the GNSS positioning device 300 determined through GNSS positioning after the start of the 5G communication is drastically different from a previous position or the signal is lost, the processor 370 may detect that a GNSS positioning error has occurred. For example, when a difference between the current position of the GNSS positioning device 300 determined through the GNSS positioning and a previous position is greater than or equal to a position change threshold (e.g., a predetermined numerical value such as 30 centimeters (cm)), the processor 370 may detect that the GNSS positioning error occurs.

When the GNSS positioning error is detected, the processor 370 may determine whether an output frequency of the first PLL 350 used for demodulating the GNSS signal in the GNSS receiver 360 is stable. In an example embodiment, whether the output frequency of the first PLL 350 is stable may be determined based on whether a clock drift occurring at the output frequency of the first PLL 350 is greater than or equal to a first threshold. When the clock drift occurring at the output frequency of the first PLL 350 is greater than or equal to the first threshold, the processor 370 may determine that the output frequency of the first PLL 350 is unstable. When the clock drift occurring at the output frequency of the first PLL 350 is less than the first threshold, the processor 370 may determine that the output frequency of the first PLL 350 is stable. For example, when the clock drift occurring at the output frequency of the first PLL 350 is greater than or equal to 50 parts per billion (ppb), the processor 370 may determine that the output frequency of the first PLL 350 is unstable.

When it is determined that the output frequency of the first PLL 350 is stable, the processor 370 may maintain the frequency used for demodulating the GNSS signal to be the output frequency of the first PLL 350.

When it is determined that an output frequency of the first PLL 350 is unstable, the processor 370 may determine whether the output frequency of the second PLL 355 is stable. In an example embodiment, whether the output frequency of the second PLL 355 is stable may be determined based on whether a clock drift occurring at the output frequency of the second PLL 355 is greater than or equal to a second threshold. When the clock drift occurring at the output frequency of the second PLL 355 is greater than or equal to the second threshold, the processor 370 may determine that the output frequency of the second PLL 355 is unstable. When the clock drift occurring at the output frequency of the second PLL 355 is less than the second threshold, the processor 370 may determine that the output frequency of the second PLL 355 is stable.

When it is determined that the output frequency of the second PLL 355 is stable, the processor 370 may change the frequency used for demodulating the GNSS signal to the output frequency of the second PLL 355. When the frequency used for demodulating the GNSS signal is changed to the output frequency of the second PLL 355, the GNSS receiver 360 may demodulate the GNSS signal using the output frequency of the second PLL 355. The output frequency of the second PLL 355 may have the clock drift lower than the clock drift of the output frequency of the first PLL 350. Thus, the GNSS receiver 360 may reduce the GNSS positioning error by demodulating the GNSS signal using a more stable frequency.

When it is determined that the output frequency of the second PLL 355 is unstable, the processor 370 may change the frequency used for demodulating the GNSS signal to a basic frequency input to the first PLL 350 and the second PLL 355. The basic frequency may be a frequency provided by the buffer 345. The basic frequency may have a clock drift lower than the clock drift of the output frequency of the second PLL 355. Thus, the GNSS receiver 360 may reduce the GNSS positioning error by demodulating the GNSS signal using a more stable frequency.

While the 5G communication is terminated and the GNSS positioning is not performed, the processor 370 may change the frequency used for demodulating the GNSS signal to the output frequency of the first PLL 350. When the 5G communication is terminated, a cause of the clock drift may be eliminated, so the unstable output frequency of the first PLL 350 may be stabilized again, and the output frequency of the first PLL 350 may be used again for demodulation of the GNSS signal.

The processor 370 may monitor whether the output frequency of the first PLL 350 is stable. When the output frequency of the first PLL 350 is stable as a result of the monitoring, the processor 370 may change the frequency used for demodulating the GNSS signal to the output frequency of the first PLL 350 again while the GNSS positioning is not performed.

In another example embodiment, the processor 370 may monitor whether output frequencies of all PLLs included in the transceiver 375 are stable. For example, the processor 370 may periodically monitor whether output frequencies of all PLLs included in the transceiver 375 are stable. When the GNSS positioning error is detected after the 5G communication is initiated, the processor 370 may determine a most stable output frequency among the output frequencies of all PLLs based on a result of the monitoring. The processor 370 may determine an output frequency of a PLL with a lowest clock drift to be an output frequency of a most stable PLL. The processor 370 may change the frequency used for demodulating the GNSS signal to the output frequency of the most stable PLL. When the output frequency of the PLL with the lowest clock drift has a clock drift greater than or equal to a threshold, the processor 370 may change the frequency used for demodulating the GNSS signal to the basic frequency. Accordingly, the GNSS receiver 360 may perform demodulation of the GNSS signal using the more stable frequency, and may quickly fix the GNSS positioning error.

For example, when the transceiver 375 includes the first PLL 350, the second PLL 355, and a third PLL (not shown), the processor 370 may monitor clock drifts of output frequencies of the first PLL 350, the second PLL 355, and the third PLL (not shown). When the GNSS positioning error is detected after the 5G communication is initiated, the processor 370 may determine an output frequency of a most stable PLL based on a result of the monitoring and change the frequency used for demodulating the GNSS signal to the output frequency of the most stable PLL. For example, when the clock drift of the output frequency of the third PLL (not shown) is the lowest and less than the threshold, the processor 370 may change the frequency used for demodulating the GNSS signal to the output frequency of the third PLL (not shown).

When a record that the frequency used for demodulating the GNSS signal has been changed is present, the processor 370 may fix the GNSS positioning error using 5G network coverage map data. A description of such will be made with reference to FIG. 4.

Figure 4:
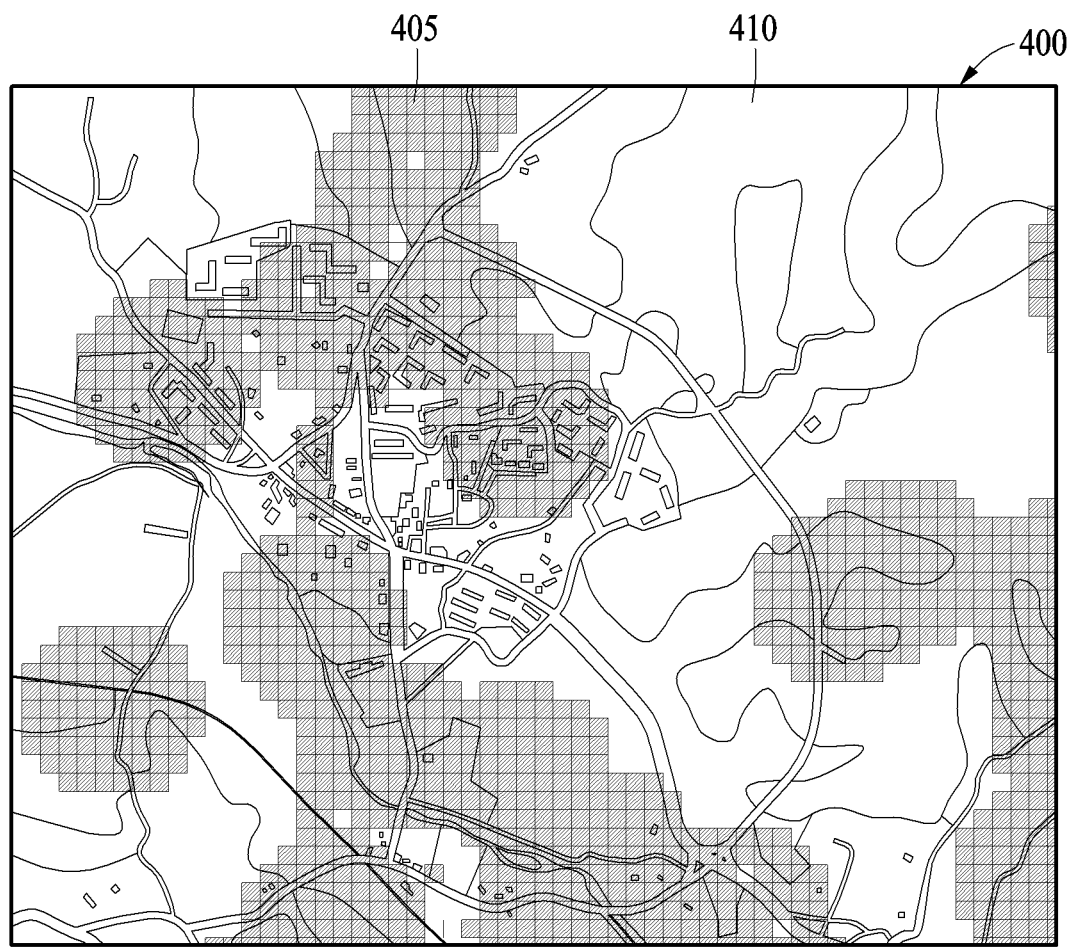
FIG. 4 is a diagram illustrating a fifth-generation (5G) network coverage map to be used in a method for GNSS positioning and an electronic device performing the method according to an example embodiment.

FIG. 4 is a diagram illustrating a 5G network coverage map to be used in a method for GNSS positioning and an electronic device performing the method according to an example embodiment.

FIG. 4 illustrates a 5G network coverage map 400 including an area 405 in which 5G communication is available (hereinafter, referred to as the "5G communication-available area 405") as indicated by square blocks and an area 410 in which the 5G communication is not available (hereinafter, referred to as the "5G communication-unavailable area 410").

The processor 370 may verify whether a record that the output frequency of the first PLL 350 used for demodulating the GNSS signal has been changed to the output frequency of the second PLL 355 included in the GNSS positioning device 300 is present. If the record that the frequency used for GNSS demodulation has been changed at least once is present, the record indicates that a GNSS positioning problem may occur again during the 5G communication performed in the GNSS positioning device 300, so the GNSS positioning device 300 may prevent a GNSS positioning error in advance using the 5G network coverage map 400.

In an example embodiment, the processor 370 may determine a current movement path of the GNSS positioning device 300 and predict an entry into the 5G communication-available area 405 based on the current movement path and the GNSS positioning device 300 and data of the 5G network coverage map 400 including information on the 5G communication-available area 405. When the entry into the 5G communication-available area 405 is predicted, the processor 370 may change a frequency used for demodulating a GNSS signal to an output frequency of the second PLL 355 included in the record before entering the 5G communication-available area 405.

In the GNSS positioning device 300 according to an example embodiment, a reason that the frequency used for GNSS demodulation has been changed to the output frequency of the second PLL 355 at the time of changing in the record may be because the output frequency of the second PLL 355 has a lower clock drift than that of the output frequency of the first PLL 350. If the clock drift of the output frequency of the second PLL 355 is lower at the time of changing in the record, the output frequency of the second PLL 355 may be less affected by the 5G communication. In this case, the GNSS positioning device 300 may change the frequency used for demodulating the GNSS signal to the output frequency of the second PLL 355, which is less affected by the 5G communication, before the GNSS positioning device 300 enters the 5G communication-available area 405, thereby preventing the GNSS positioning error due to the 5G communication in advance.

While the GNSS positioning device 300 is out of an area in which the 5G communication is available and the GNSS positioning is terminated, the processor 370 may change a frequency used for GNSS positioning to the output frequency of the first PLL 350.

The processor 370 may monitor whether the output frequency of the first PLL 350 is stable. When the output frequency of the first PLL 350 is stable, the processor 370 may change the frequency used for demodulating the GNSS signal to the output frequency of the first PLL 350 while the GNSS positioning is not performed.

According to an example embodiment, the electronic device 101 of FIG. 1 may include the processor 370, the GNSS antenna 310 that receives a GNSS signal from a satellite for GNSS positioning, the GNSS receiver 360 that demodulates the GNSS signal, the RF transceiver 365, the first PLL 350 that provides a first output frequency for operating the GNSS receiver 360 and the second PLL 355 that provides a second output frequency for operating the RF transceiver 365, may include the transceiver 375 that communicates with the processor 370 and an antenna for 5G communication, and may include the 5G module 315 that communicates with the RF transceiver 365.

According to an example embodiment, the processor 370 may monitor whether an error of the GNSS positioning occurs during the 5G communication, determine whether the output frequency (e.g., the first output frequency) of the first PLL 350 used for demodulating the GNSS signal is stable, and when the output frequency of the first PLL 350 is unstable, change a frequency used for demodulating the GNSS signal to the output frequency (e.g., the second output frequency) of the second PLL 355 or a basic frequency input to the first PLL 350 and the second PLL 355.

According to an example embodiment, when a clock drift occurring at the output frequency of the first PLL 350 is greater than or equal to a first threshold, the processor 370 may determine that the output frequency of the first PLL 350 is unstable. When the clock drift occurring at the output frequency of the first PLL 350 is less than the first threshold, the processor 370 may determine that the output frequency of the first PLL 350 is stable.

According to an example embodiment, the processor 370 may determine whether the output frequency of the second PLL 355, and when the output frequency of the second PLL 355 is stable, change the frequency used for demodulating the GNSS signal to the output frequency of the second PLL 355. When the output frequency of the second PLL 355 is unstable, the processor 370 may change the frequency used for demodulating the GNSS signal to the basic frequency.

According to an example embodiment, when a clock drift occurring at the output frequency of the second PLL 355 is greater than or equal to a second threshold, the processor 370 may determine that the output frequency of the second PLL 355 is unstable. When the clock drift occurring at the output frequency of the second PLL 355 is less than the second threshold, the processor 370 may determine that the output frequency of the second PLL 355 is stable.

According to an example embodiment, while the 5G communication is terminated in the electronic device 101 and the GNSS positioning is not performed, the processor 370 may change the frequency used for demodulating the GNSS signal to the output frequency of the first PLL 350.

According to an example embodiment, the processor 370 may monitor whether the output frequency of the first PLL 350 is stable. When the clock drift of the output frequency of the first PLL 350 is stable as a result of the monitoring, the processor 370 may change the frequency used for demodulating the GNSS signal to the output frequency of the first PLL 350 while the GNSS positioning is not performed.

According to an example embodiment, the processor 370 may determine a current movement path of the electronic device 101, predict an entry into the 5G communication-available area 405 based on the current movement path and data of the 5G network coverage map 400 including the information on the 5G communication-available area 405, and when a record that the frequency used for demodulating the GNSS signal has been changed is present, change the frequency used for demodulating the GNSS signal to the output frequency of the second PLL 355 before entering the 5G communication-available area 405.

According to an example embodiment, when the electronic device 101 is out of the 5G communication-available area 405 and the GNSS positioning is terminated, the processor 370 may change the frequency used for demodulating the GNSS signal to the output frequency of the first PLL 350.

According to an example embodiment, the processor 370 may monitor whether the output frequency of the first PLL 350 is stable. When the clock drift of the output frequency of the first PLL 350 is stable, the processor 370 may change the frequency used for demodulating the GNSS signal to the output frequency of the first PLL 350 while the GNSS positioning is not performed.

According to an example embodiment, when a difference between a current position determined through the GNSS positioning and a previous position is greater than or equal to a position change threshold, the processor 370 may detect that an error of the GNSS positioning occurs.

Figure 5:
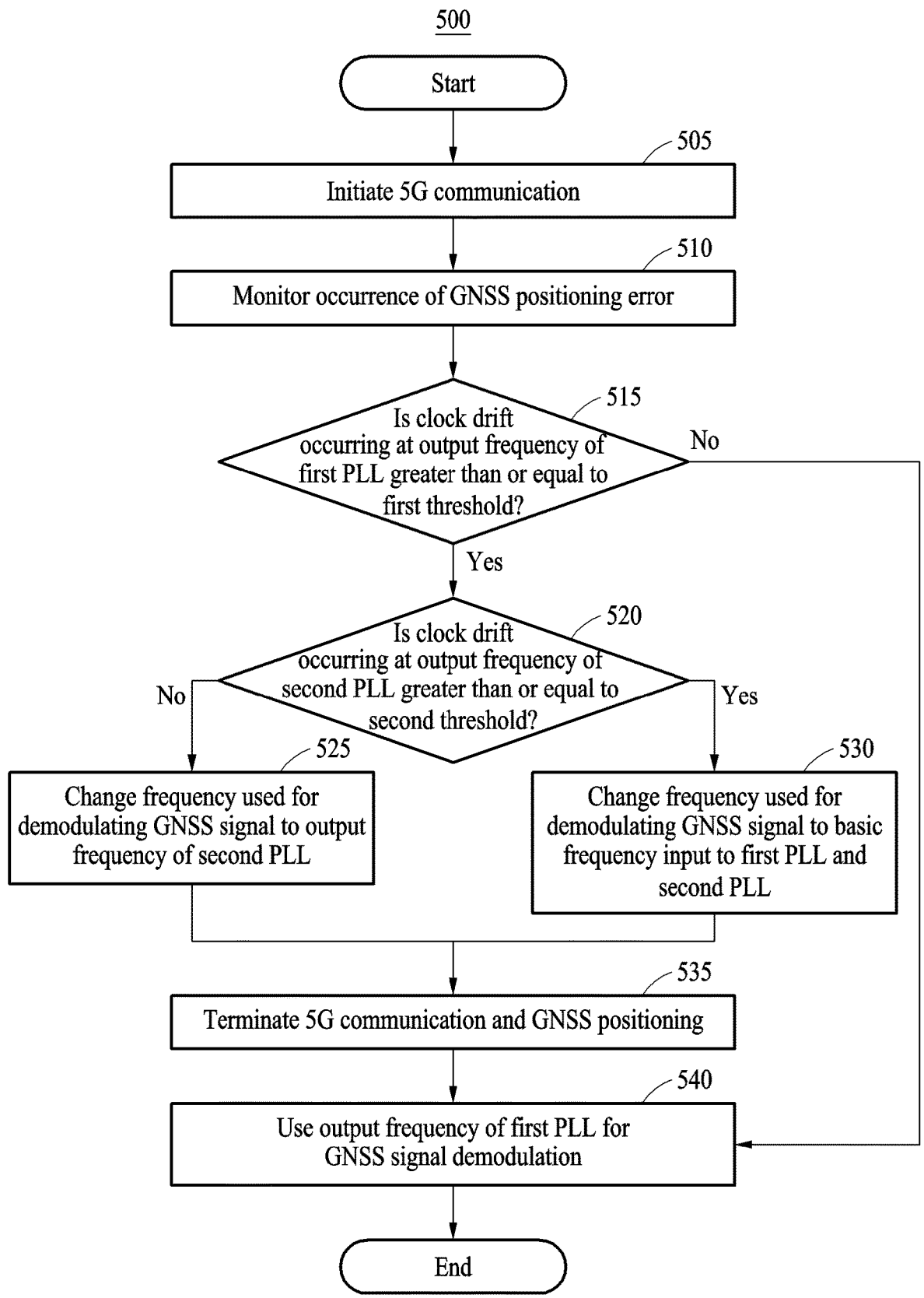
FIG. 5 is a flowchart illustrating a method for GNSS positioning according to an example embodiment.

FIG. 5 is a flowchart illustrating a method 500 for GNSS positioning according to an example embodiment. In operation 505, the GNSS positioning device 300 may initiate 5G communication. For example, the GNSS positioning device 300 may move from the 5G communication-unavailable area 410 to the 5G communication-available area 405 of FIG. 4 and initiate the 5G communication.

In operation 510, the GNSS positioning device 300 may monitor an occurrence of a GNSS positioning error. When the 5G communication is initiated, a problem may occur in GNSS positioning of the GNSS positioning device 300, and the GNSS positioning device 300 may detect the occurrence of a GNSS positioning error. After the 5G communication is initiated in operation 505, if the current position determined through GNSS positioning is drastically different from the previous position or the signal is lost, the GNSS positioning device 300 may detect that the GNSS positioning error occurs. For example, when a difference between the current position determined through the GNSS positioning and the previous position is greater than or equal to a position change threshold, the GNSS positioning device 300 may detect that the GNSS positioning error occurs.

In operation 515, the GNSS positioning device 300 may determine whether the output frequency (e.g., the first output frequency) of the first PLL 350 is stable by determining whether a clock drift (e.g., a first clock drift) occurring at the output frequency of the first PLL 350, which is used for demodulating the GNSS signal, is greater than or equal to a first threshold.

When the clock drift of the output frequency of the first PLL 350 is less than the threshold, the cause of the GNSS positioning error may not be the clock drift. Thus, in operation 540, the GNSS positioning device 300 may use the output frequency of the first PLL 350 instead of changing the frequency used for demodulating the GNSS signal. According to an example embodiment, the GNSS positioning device 300 may periodically perform operation 510 to monitor whether the GNSS positioning error occurs while the output frequency of the first PLL 350 is used for the demodulation of the GNSS signal.

When the clock drift of the output frequency of the first PLL 350 is greater than or equal to the threshold, in operation 520, the GNSS positioning device 300 may determine whether the output frequency (e.g., the second output frequency) of the second PLL 355 is stable by determining whether a clock drift (e.g., a second clock drift) occurring at the output frequency of the second PLL 355 is greater than or equal to a second threshold. The first threshold and the second threshold may be the same or different.

When the clock drift of the output frequency of the second PLL 355 is less than the threshold, the output frequency of the second PLL 355 may be less affected by the 5G module 315 and may be stable. Thus, in operation 525, the GNSS positioning device 300 may change the frequency used for demodulating the GNSS signal to the output frequency of the second PLL 355. The GNSS positioning device 300 may quickly recover from the GNSS positioning error and accurately measure the current position by demodulating the GNSS signal using a more stable frequency.

When the clock drift of the output frequency of the second PLL 355 is greater than or equal to the threshold, the output frequency of the second PLL 355 may be unstable. Thus, in operation 530, the GNSS positioning device 300 may change the frequency used for demodulating the GNSS signal to the basic frequency. The basic frequency may be a frequency provided by the buffer 345 that supplies a frequency to the first PLL 350 and the second PLL 355. The GNSS positioning device 300 may avoid an occurrence of the GNSS positioning error by demodulating the GNSS signal using the basic frequency instead of an unstable frequency.

In operation 535, the 5G communication and the GNSS positioning may be terminated. When the 5G communication and the GNSS positioning are terminated, in operation 540, the GNSS positioning device 300 may change the frequency used for demodulating the GNSS signal to the output frequency of the first PLL 350 again.

In another example, the GNSS positioning device 300 may monitor whether the output frequency of the first PLL 350 is stable instead of performing operation 535. When the output frequency of the first PLL 350 is stable as a result of the monitoring, in operation 540, the GNSS positioning device 300 may change the frequency used for demodulating the GNSS signal to the output frequency of the first PLL 350 while the GNSS positioning is terminated.

Figure 6:
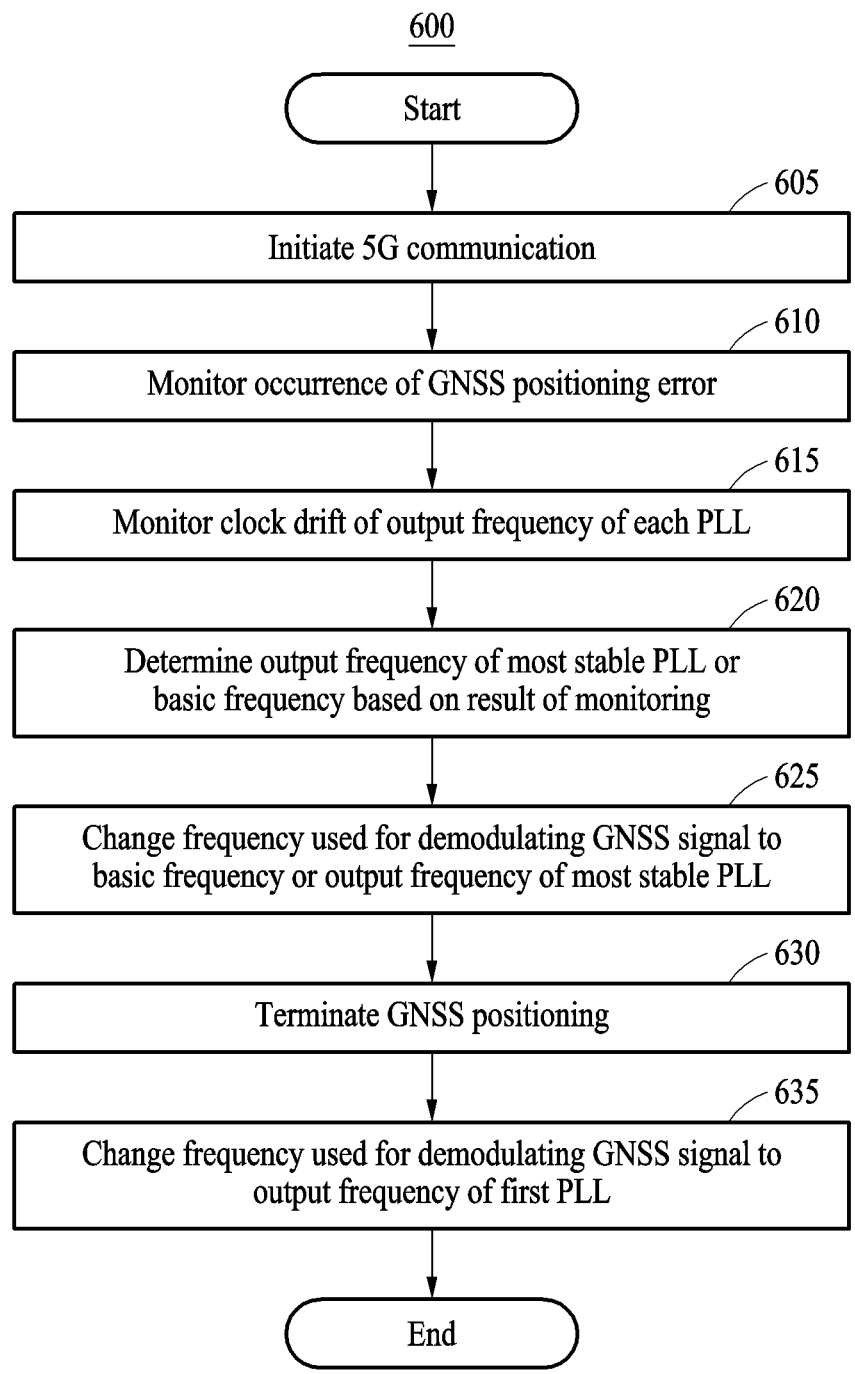
FIG. 6 is a flowchart illustrating a method for GNSS positioning according to another example embodiment.

FIG. 6 is a flowchart illustrating a method 600 for GNSS positioning according to another example embodiment.

In operation 605, the GNSS positioning device 300 may initiate 5G communication. For example, the GNSS positioning device 300 may move from the 5G communication-unavailable area 410 to the 5G communication-available area 405 of FIG. 4 and initiate the 5G communication.

In operation 610, the GNSS positioning device 300 may monitor an occurrence of a GNSS positioning error. An error may occur in GNSS positioning of the GNSS positioning device 300, and the GNSS positioning device 300 may detect the occurrence of the GNSS positioning error. After the 5G communication is initiated in operation 605, if the current position determined through GNSS positioning is drastically different from the previous position or the signal is lost, the GNSS positioning device 300 may detect that the GNSS positioning error occurs. For example, when a difference between the current position determined through the GNSS positioning and the previous position is greater than or equal to a position change threshold, the GNSS positioning device 300 may detect that the GNSS positioning error occurs.

In operation 615, the GNSS positioning device 300 may monitor a clock drift of an output frequency of each of the PLLs included in the GNSS positioning device 300.

In operation 620, the GNSS positioning device 300 may determine an output frequency of a most stable PLL among the PLLs included in the GNSS positioning device 300 based on a result of the monitoring. The GNSS positioning device 300 may determine an output frequency of a PLL having a lowest clock drift to be the output frequency of the most stable PLL. For example, when a clock drift of the output frequency of the first PLL 350 is 70 ppb, a clock drift of the output frequency of the second PLL 355 is 50 ppb, and a clock drift of an output frequency of a third PLL is 20 ppb, the GNSS positioning device 300 may determine the output frequency of the third PLL to be the output frequency of the most stable PLL. In operation 620, when the output frequency of the PLL having the lowest clock drift has a clock drift greater than or equal to a threshold, the GNSS positioning device 300 may determine that a basic frequency is a most stable frequency instead of output frequencies of the PLLs.

In operation 625, the GNSS positioning device 300 may change the frequency used for demodulating the GNSS signal to the basic frequency or the output frequency of the most stable PLL determined in operation 620. The GNSS positioning device 300 may demodulate the GNSS signal using the output frequency of the most stable PLL when a GNSS positioning error occurs, so that the GNSS positioning error is quickly fixed and positioning is performed accurately.

In operation 630, the GNSS positioning may be terminated. When the GNSS positioning is terminated, in operation 635, the GNSS positioning device 300 may change the frequency used for demodulating the GNSS signal to the output frequency of the first PLL 350 based on a result obtained by monitoring the clock drift of the output frequency of the first PLL 350. For example, as a result obtained by monitoring the clock drift of the output frequency of the first PLL 350, when the clock drift of the output frequency of the first PLL 350 is less than a threshold, the output frequency of the first PLL 350 may be stable. Thus, the GNSS positioning device 300 may change the frequency used for demodulating the GNSS signal to the output frequency of the first PLL 350 again.

Figure 7:
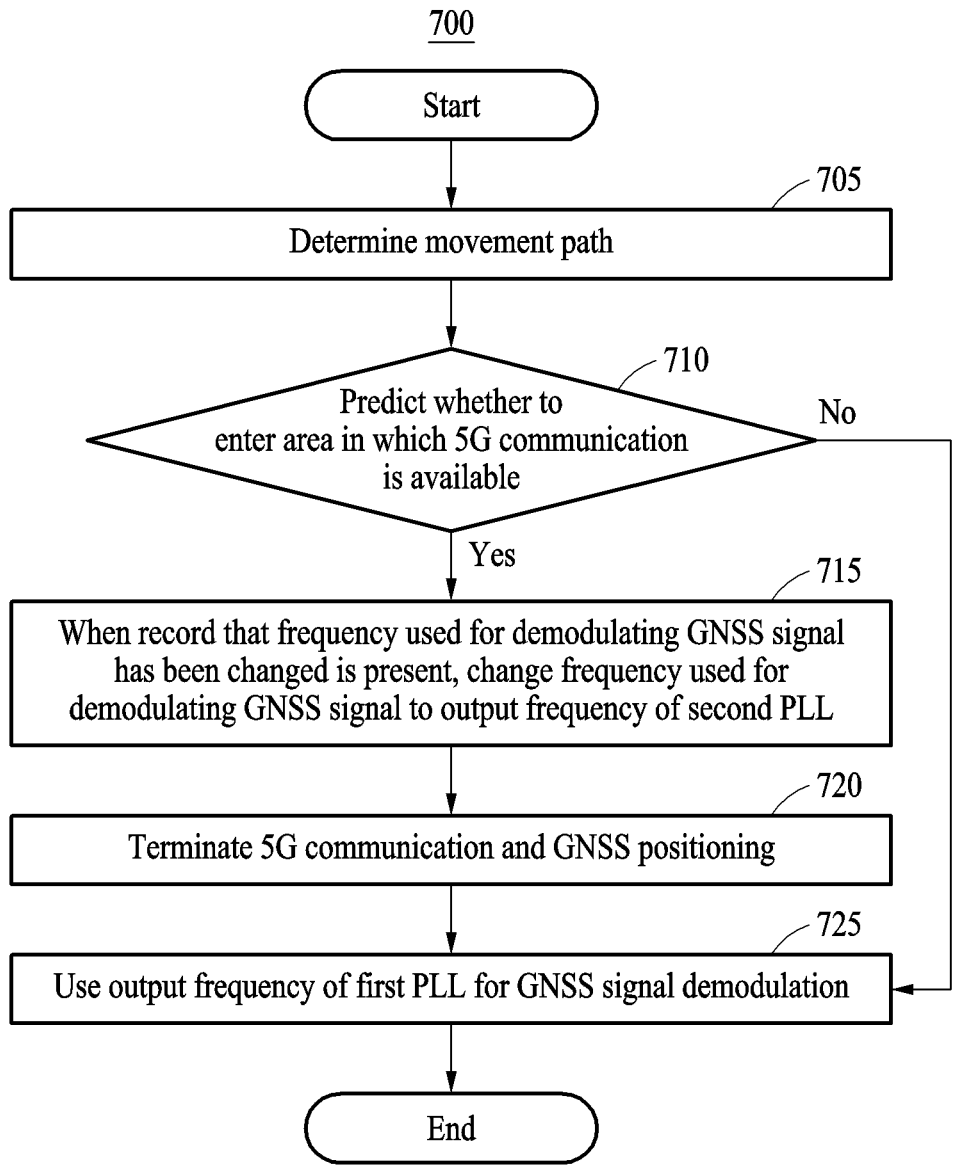
FIG. 7 is a flowchart illustrating a method of performing GNSS positioning using 5G network coverage map data according to an example embodiment.

FIG. 7 is a flowchart illustrating a method 700 of performing GNSS positioning using 5G network coverage map data according to an example embodiment.

FIG. 7 illustrates a method to prevent a GNSS positioning error in advance during 5G communication using the 5G network coverage map 400 of FIG. 4. Operation 705 may be performed after operation 540 of the method 500 of FIG. 5. Alternatively, the method 700 may not be associated with an error condition and may be performed after determining that a second clock drift of the second output frequency of the second PLL 355 is less than a first clock drift of the first output frequency of the first PLL 350.

In operation 705, the GNSS positioning device 300 may determine a current movement path.

In operation 710, the GNSS positioning device 300 may predict whether to enter the 5G communication-available area 405 based on the current movement path and data of the 5G network coverage map 400 including information on the 5G communication-available area 405.

When it is predicted not to enter the 5G communication-available area 405, in operation 725, the GNSS positioning device 300 may use the output frequency of the first PLL 350 instead of changing the frequency used for demodulating the GNSS signal.

When it is predicted to enter the 5G communication-available area 405 and a record that the frequency used for demodulating the GNSS signal has been changed is present, in operation 715, the GNSS positioning device 300 may change the frequency used for demodulating the GNSS signal to the output frequency of the second PLL 355 included in the record before entering the 5G communication-available area 405.

If a record that the frequency used for GNSS demodulation has been changed at least once is present, the record may indicate that a GNSS positioning problem may occur again during the 5G communication. A reason that the frequency used for GNSS demodulation has been changed to the output frequency of the second PLL 355 at the time of changing in the record may be because the output frequency of the second PLL 355 has a lower clock drift than that of the output frequency of the first PLL 350. If the clock drift of the output frequency of the second PLL 355 is lower at the time of changing in the record of the change, the output frequency of the second PLL 355 may be less affected by the 5G module 315. In this case, the GNSS positioning device 300 may change the frequency used for demodulating the GNSS signal to the output frequency of the second PLL 355, which is less affected by the 5G communication, before entering the 5G communication-available area 405, thereby preventing the GNSS positioning error due to the 5G communication in advance. Thus, the record that the frequency used for demodulating the GNSS signal is changed can be created based on determining that the second clock drift of the second output frequency of the second PLL 355 is less than the first clock drift of the first output frequency of the first PLL 350.

In operation 720, the 5G communication and the GNSS positioning may be terminated. When the 5G communication and the GNSS positioning are terminated, in operation 725, the GNSS positioning device 300 may change the frequency used for demodulating the GNSS signal to the output frequency of the first PLL 350 again.

In another example, the GNSS positioning device 300 may monitor whether the output frequency of the first PLL 350 is stable instead of performing operation 720. When the output frequency of the first PLL 350 is stable, in operation 725, the GNSS positioning device 300 may change the frequency used for demodulating the GNSS signal to the output frequency of the first PLL 350 while the GNSS positioning is terminated.

According to an example embodiment, a method for performing GNSS positioning may include an operation of monitoring whether an error of the GNSS positioning occurs, an operation of determining, when the error of the GNSS positioning is detected, whether an output frequency of the first PLL 350 used for demodulating a GNSS signal received from a satellite for the GNSS positioning is stable, and an operation of changing, when the output frequency of the first PLL 350 is unstable, a frequency used for demodulating the GNSS signal to an output frequency of the second PLL 355 or a basic frequency input to the first PLL 350 and the second PLL 355.

The operation of determining whether the output frequency of the first PLL 350 is stable may include an operation of determining that the output frequency of the first PLL 350 is unstable when a clock drift occurring at the output frequency of the first PLL 350 is greater than or equal to a first threshold, and an operation of determining that the output frequency of the first PLL 350 is stable when the clock drift occurring at the output frequency of the first PLL 350 is less than the first threshold.

The operation of changing to the output frequency of the second PLL 355 or the basic frequency input to the first PLL 350 and the second PLL 355 may include an operation of determining whether the output frequency of the second PLL 355 is stable, an operation of changing, when the output frequency of the second PLL 355 is stable, the frequency used for demodulating the GNSS signal to the output frequency of the second PLL 355, and an operation of changing, when the output frequency of the second PLL 355 is unstable, the frequency used for demodulating the GNSS signal to the basic frequency.

The operation of determining whether the output frequency of the second PLL 355 is stable may include an operation of determining that the output frequency of the second PLL 355 is unstable when a clock drift occurring at the output frequency of the second PLL 355 is greater than or equal to a second threshold, and an operation of determining that the output frequency of the second PLL 355 is stable when the clock drift occurring at the output frequency of the second PLL 355 is less than the second threshold.

The method may further include an operation of changing the frequency used for demodulating the GNSS signal to the output frequency of the first PLL 350 while the 5G communication is terminated and the GNSS positioning is not performed.

The method may further include an operation of monitoring whether the output frequency of the first PLL 350 is stable, and an operation of changing, when the output frequency of the first PLL 350 is stable as a result of the monitoring, the frequency used for demodulating the GNSS signal to the output frequency of the first PLL 350 while the GNSS positioning is not performed.

The method may further include an operation of determining a current movement path of the electronic device 101, an operation of predicting an entry into the 5G communication-available area 405 based on the current movement path and data of the 5G network coverage map 400 including information on the 5G communication-available area 405, and an operation of changing, when a record that the frequency used for demodulating the GNSS signal has been changed is present, the frequency used for demodulating the GNSS signal to the output frequency of the second PLL 355 before entering the 5G communication-available area 405.

The method may further include an operation of changing the frequency used for demodulating the GNSS signal to the output frequency of the first PLL 350 while the electronic device 101 is out of the 5G communication-available area 405 and the GNSS positioning is terminated.

The method may further include an operation of monitoring whether the output frequency of the first PLL 350 is stable, and an operation of changing, when the output frequency of the first PLL 350 is stable, the frequency used for demodulating the GNSS signal to the output frequency of the first PLL 350 while the GNSS positioning is not performed.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory computer-readable storage medium which stores instructions that, when executed by a processor, cause the processor to perform a method. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A method of performing global navigation satellite system (GNSS) positioning while fifth-generation (5G) communication is performed in an electronic device, the method comprising:
monitoring whether an error of the GNSS positioning occurs based on determining that a current position of the electronic device determined through GNSS positioning after starting 5G communication changes greater than a position change threshold or the current position is lost;
determining, when the error of the GNSS positioning is detected, whether a first output frequency of a first phase locked loop (PLL) of the electronic device used for demodulating a GNSS signal received from a satellite for the GNSS positioning is stable; and
changing, when the first output frequency of the first PLL is unstable, a frequency used for demodulating the GNSS signal to a second output frequency of a second PLL of the electronic device, or a basic frequency input to the first PLL and the second PLL.

2. The method of claim 1, wherein the determining of whether the first output frequency of the first PLL is stable comprises:
determining that the first output frequency of the first PLL is unstable when a clock drift occurring at the first output frequency of the first PLL is greater than or equal to a first threshold; and
determining that the first output frequency of the first PLL is stable when the clock drift occurring at the first output frequency of the first PLL is less than the first threshold.

3. The method of claim 1, wherein the changing to the second output frequency of the second PLL or the basic frequency input to the first PLL and the second PLL comprises:
determining whether the second output frequency of the second PLL is stable;
changing, when the second output frequency of the second PLL is stable, the frequency used for demodulating the GNSS signal to the second output frequency of the second PLL; and
changing, when the second output frequency of the second PLL is unstable, the frequency used for demodulating the GNSS signal to the basic frequency.

4. The method of claim 3, wherein the determining of whether the second output frequency of the second PLL is stable comprises:
determining that the second output frequency of the second PLL is unstable when a clock drift occurring at the second output frequency of the second PLL is greater than or equal to a second threshold; and
determining that the second output frequency of the second PLL is stable when the clock drift occurring at the second output frequency of the second PLL is less than the second threshold.

5. The method of claim 1, further comprising:
changing the frequency used for demodulating the GNSS signal to the first output frequency of the first PLL while the 5G communication is terminated and the GNSS positioning is not performed.

6. The method of claim 5, further comprising:
determining a current movement path of the electronic device;
predicting an entry into an area in which the 5G communication is available based on the current movement path and 5G network coverage map data comprising information on the area in which the 5G communication is available; and
changing, when a record that the frequency used for demodulating the GNSS signal is changed is present, the frequency used for demodulating the GNSS signal to the second output frequency of the second PLL before entering the area in which the 5G communication is available.

7. The method of claim 6, further comprising:
changing the frequency used for demodulating the GNSS signal to the first output frequency of the first PLL while the electronic device is out of the area in which the 5G communication is available and the GNSS positioning is terminated.

8. The method of claim 1, further comprising:
monitoring whether the first output frequency of the first PLL is stable; and
changing, when the first output frequency of the first PLL is stable as a result of the monitoring, the frequency used for demodulating the GNSS signal to the first output frequency of the first PLL while the GNSS positioning is not performed.

9. An electronic device comprising:
a processor;
a global navigation satellite system (GNSS) antenna configured to receive a GNSS signal from a satellite to perform GNSS positioning;
a transceiver comprising a GNSS receiver that demodulates the GNSS signal, a radio frequency (RF) transceiver, a first phase locked loop (PLL) that provides a first output frequency for operating the GNSS receiver, and a second PLL that provides a second output frequency for operating the RF transceiver, and configured to communicate with the processor; and
a fifth-generation (5G) module comprising an antenna for 5G communication and configured to communicate with the RF transceiver,
wherein the processor is configured to:
monitor whether an error of the GNSS positioning occurs based on determining that a current position of the electronic device determined through GNSS positioning after starting 5G communication changes greater than a position change threshold or the current position is lost during the 5G communication, determine whether the first output frequency of the first PLL used for demodulating the GNSS signal is stable, and change, when the first output frequency of the first PLL is unstable, a frequency used for demodulating the GNSS signal to the second output frequency of the second PLL or a basic frequency input to the first PLL and the second PLL.

10. The electronic device of claim 9, wherein the processor is configured to:

determine that the first output frequency of the first PLL is unstable when a clock drift occurring at the first output frequency of the first PLL is greater than or equal to a first threshold; and determine that the first output frequency of the first PLL is stable when the clock drift occurring at the first output frequency of the first PLL is less than the first threshold.

11. The electronic device of claim 9, wherein the processor is configured to:

determine whether the second output frequency of the second PLL is stable;

change, when the second output frequency of the second PLL is stable, the frequency used for demodulating the GNSS signal to the second output frequency of the second PLL; and change, when the second output frequency of the second PLL is unstable, the frequency used for demodulating the GNSS signal to the basic frequency.

12. The electronic device of claim 11, wherein the processor is configured to:

determine that the second output frequency of the second PLL is unstable when a clock drift occurring at the second output frequency of the second PLL is greater than or equal to a second threshold; and determine that the second output frequency of the second PLL is stable when the clock drift occurring at the second output frequency of the second PLL is less than the second threshold.

13. The electronic device of claim 9, wherein the processor is configured to change the frequency used for demodulating the GNSS signal to the first output frequency of the first PLL while the 5G communication is terminated and the GNSS positioning is not performed.

14. The electronic device of claim 13, wherein the processor is configured to:

determine a current movement path of the electronic device;

predict an entry into an area in which the 5G communication is available based on the current movement path and 5G network coverage map data comprising information on the area in which the 5G communication is available; and change, when a record that the frequency used for demodulating the GNSS signal is changed is present, the frequency used for demodulating the GNSS signal to the second output frequency of the second PLL before entering the area in which the 5G communication is available.

15. The electronic device of claim 14, wherein the processor is configured to change the frequency used for demodulating the GNSS signal to the first output frequency of the first PLL while the electronic device is out of the area in which the 5G communication is available and the GNSS positioning is terminated.

16. The electronic device of claim 14, wherein the processor is configured to:

monitor whether the first output frequency of the first PLL is stable; and changing, when a clock drift of the first output frequency of the first PLL is stable, the frequency used for demodulating the GNSS signal to the first output frequency of the first PLL while the GNSS positioning is not performed.

17. The electronic device of claim 9, wherein the processor is configured to:

monitor whether the first output frequency of the first PLL is stable; and change, when a clock drift of the first output frequency of the first PLL is stable as a result of the monitoring, the frequency used for demodulating the GNSS signal to the first output frequency of the first PLL while the GNSS positioning is not performed.

18. The electronic device of claim 9, wherein the processor is configured to detect that the error of the GNSS positioning occurs when a difference between a current position determined through the GNSS positioning and a previous position is greater than or equal to a position change threshold.

19. A method of performing global navigation satellite system (GNSS) positioning in an electronic device having fifth-generation (5G) communication capability, the method comprising:

determining a current movement path of the electronic device;

predicting an entry into an area in which the 5G communication is available based on the current movement path and 5G network coverage map data comprising information on the area in which the 5G communication is available; and changing, when a record that a frequency used for demodulating a GNSS signal is changed is present, the frequency used for demodulating the GNSS signal from a first output frequency of a first phase locked loop (PLL) of the electronic device to a second output frequency of a second PLL of the electronic device before entering the area in which the 5G communication is available.

20. The method of claim 19, further comprising:

determining whether a second clock drift of the second output frequency of the second PLL is less than a first clock drift of the first output frequency of the first PLL; and creating the record that the frequency used for demodulating the GNSS signal is changed based on determining that the second clock drift of the second output frequency of the second PLL is less than the first clock drift of the first output frequency of the first PLL.

* * * * *